Figure 1:
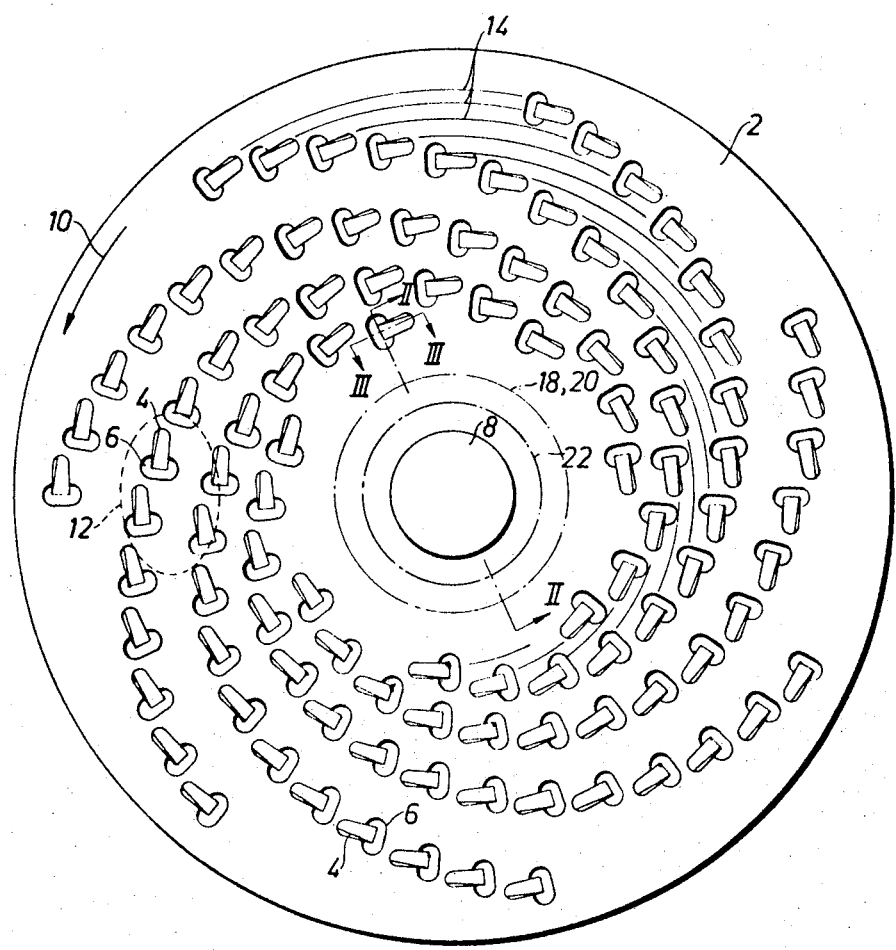

United States Patent [19]

Nystrom et al.

[11] 3,746,062

[45] July 17, 1973

[54] WOOD CHIPPER OR THE LIKE

[75] Inventors: Kjell Signar Nystrom; Gosta Ingemar Larsson, both of Pitea, Sweden

[73] Assignee: Pitea Maskin Industrie, Nystrom & Larsson AB, Pitea, Sweden

[22] Filed: Dec. 13, 1971

[21] Appl. No.: 207,285

[52] U.S. Cl. .................. 144/176, 241/296, 241/92, 144/221, 144/218
[51] Int. Cl. ............................................. B27c 1/00
[58] Field of Search .................. 144/176, 218, 231, 144/221; 241/92, 296

[56] References Cited
UNITED STATES PATENTS

| 3,346,027 | 10/1967 | Kirsten | 144/176 |
| 2,570,845 | 10/1951 | Ottersland | 241/92 X |
| 3,030,987 | 4/1962 | Jackson et al. | 144/176 X |
| 3,410,495 | 11/1968 | Eklund | 241/92 X |

*Primary Examiner*—Andrew R. Juhasz
*Assistant Examiner*—W. D. Bray
*Attorney*—Fred Philpitt

[57] ABSTRACT

The present invention relates to a wood chipper or the like, comprising a plurality of cutting or chipping tools carried by a rotatable tool holder.

3 Claims, 3 Drawing Figures

3,746,062

WOOD CHIPPER OR THE LIKE

BACKGROUND

In conventional chippers for chipping round timber to chips the cutting or chipping tools are formed either as knives, which are of the same length as the largest round timber to be treated, or as small cutting elements, a number of which are simultaneously engaging the timber during the treatment. The knives are arranged substantially radially on a tool holder in the form of a rotable plane disc and the small cutting elements may be distributed in a convenient manner on a similar, plane disc, on a conical disc or on a cylinder. In operation the tool holder is subjected to very heavy stresses, which necessitate a sturdy and resistent dimensioning mainly to secure a sufficient rigidity thereof. In conventional wood chippers the tool holder has, therefore, been made solid, e.g., by casting, which may give the tool holder a substantial weight. A plane solid disc made by casting with a diameter of 2.5 m may thus have a weight of about 4 tons. In addition to the fact that such a tool holder is costly and complicated to manufacture, it exposes the machine base, the power transmission and the like to heavy stresses.

THE PRESENT INVENTION

The object of the present invention has been to eliminate the above disadvantages and to provide a tool holder which is considerably lighter than the tool holders of previously known wood chippers. The object has been attained in that the tool holder comprises at least two construction elements, located traversally of the tool carrying surface of the tool holder and spaced from each other, one of which forms a tool carrying main part, the other element forming a reinforcing part which increases the rigidity of the first mentioned part.

By means of the present invention it is possible to reduce the weight of the tool holder to about half the weight as compared with a conventional tool holder with a tool carrying surface of the same dimensions.

Figure 2:
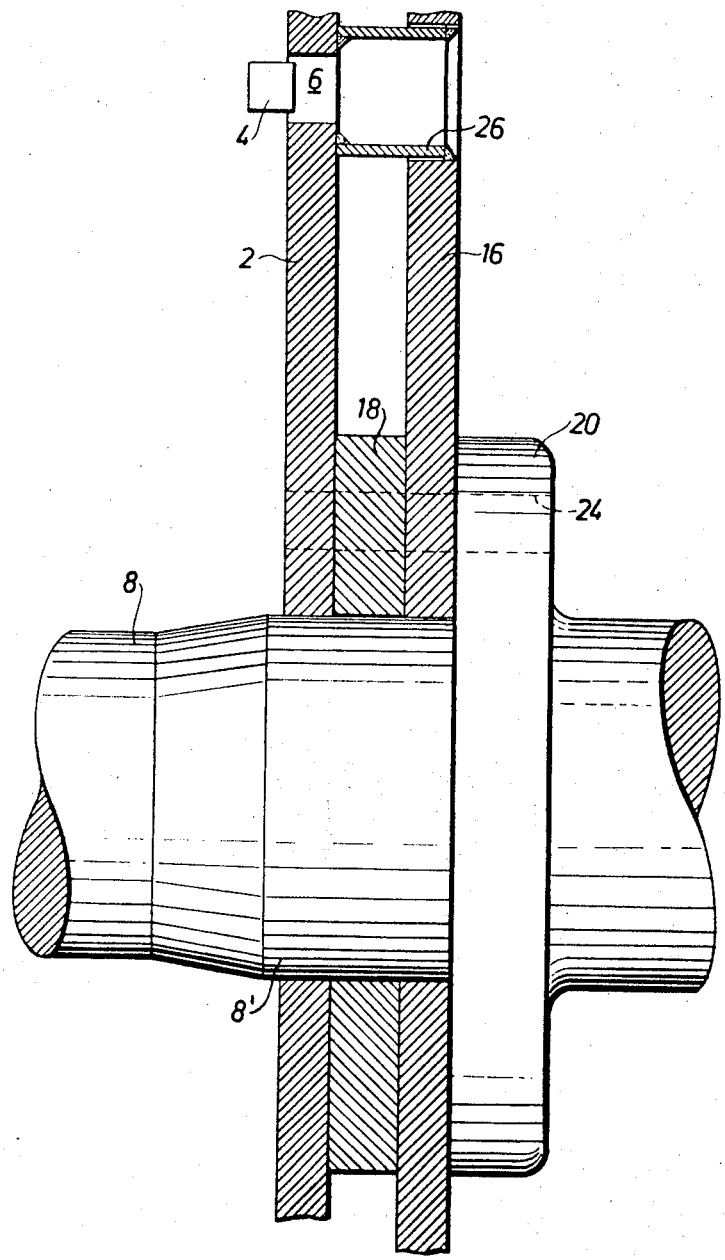
Figure 3:
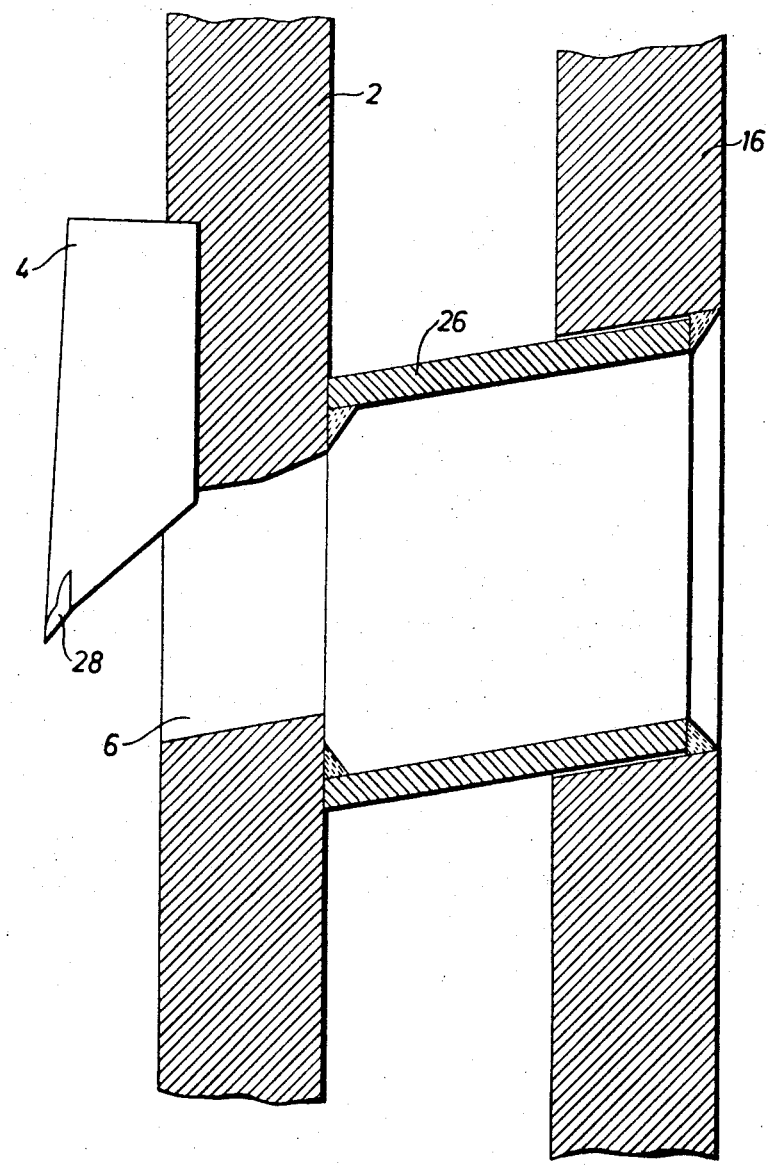

An embodiment of a wood chipper operating with small cutting elements according to the present invention will now be described in connection with the accompanying drawings, in which FIG. 1 shows a plan view of a tool holder for the cutting elements utilized in this machine in the form of a composite, plane, rotable disc, the distribution of the cutting elements also being illustrated;

FIG. 2 in a larger scale a section, mainly in the direction of the arrows II—II in FIG. 1; and FIG. 3 in a still larger scale a section mainly in the direction of the arrows III—III in FIG. 1.

The portion of the tool holder with cutting element holders, given only as an exemplary embodiment, which is illustrated in FIG. 1, is of the same kind as the arrangement defined in copending U.S. patent application Ser. No. 66,547 filed August 24, 1970 and will thus be described here only briefly. The disc referenced 2 on its surface carries a number of cutting element holders 4, located adjacent one through hole 6 each in the disc for cut off chips. The disc 2 is mounted on a driving shaft 8 and is adapted to be rotated thereby in the rotary direction indicated by the arrow 10. For the treatment of timber, e.g., round timber, to chips, the round timber is fed with one end first at an oblique angle towards the disc, so that the projection of the treated surface of the round timber on the disc 2 assumes the shape of an ellipse 12, as described in detail in said copending patent application. As also described in said patent specification, the cutting element holders 4 are preferably arranged at a number of concentrical circular lines 14.

As shown in FIG. 2 and 3 the tool holder comprises a second disc 16, which is parallel with the disc 2. Between the two discs 2 and 16 a spacing ring 18 is provided on an enlarged portion 8' of the shaft 8. The two parallel discs 2 and 16 with the intermediate spacing ring 18 drawn against and securely connected with a radial flange 20 on the shaft 8 by means of bolt connections (not shown). The bolt connection is illustrated in FIG. 1 by a dash-dot line 22 and in FIG. 2 by a bolt hole 24 extending through the disc 2, the spacing ring 18, the disc 16 and the flange 20. At the location of each cutting element holder 4 with a through hole 6 in the disc 2 a sleeve shaped spacing element 26 is provided between the two discs 2 and 16 and connected therewith, e.g., by means of welding in the manner illustrated in FIG. 2. The cross section of the spacing element 26 may be, e.g., square.

As shown more closely in FIG. 3 the spacing element 26 extends in a direction towards the driving shaft of the tool holder, at an oblique angle towards the surface of the discs 2 and 16, and generally aligned with the through hole 6, which has the same inclination. FIG. 3 also shows a cutting element 28 secured in a convenient manner in the cutting element holder 4, of the same type as described in the patent mentioned above.

As will be apparent from the above, the spacing sleeves 26 serve both as spacing elements and as passage elements for chips, which have been cut at the cutting elements 28 and pass through the openings to the rear side of the tool holder, i.e., the disc 16.

Due to the construction illustrated and described above, the tool holder may be made considerably lighter than has been possible up to the present by forming the discs 2 and 16 of a relatively thin material as compared to the thick cast discs previously used. As a material for the discs 2 and 16, e.g., standard sheet with a thickness of 35 mmm may be selected, and it is no longer necessary to use specially cast, and, therefore, costly discs. At the same time a sufficient rigidity of the tool carrying disc 2 is maintained, which is of great importance.

It should be noted that to a certain extent the present invention may be regarded as a new principle in the construction of such machines for which it is intended, i.e., large wood chippers and the like. It has been made possible partly by the development within the actual art to which the subject matter of the above mentioned patent relates, since large rotational masses of the tool holder are no longer necessary and the problem of the balancing of the tool holder is mainly eliminated. While the invention is best utilized in machines of the type described, it may of course also be used in wood chippers of a more conventional type with suitable modifications, which are within the scope of the accompanying claims. It should be noted that neither is the invention limited to plane tool holders but may also be adapted for, e.g., conical discs or tool holders of drum shape.

While the embodiment described above the two discs are of the same size and are mounted directly on the driving shaft, it is also possible to form the disc 16 with a smaller diameter than the disc 2, provided that a sufficient rigidity of the latter is maintained and it is also possible to design the two discs in the form of wide rings connected with the driving shaft by means of strong spokes. In addition, it is possible to form the tool holder as comprising more than one reinforcing element similar to the disc 16.

We claim:

1. A woodchipping machine for chipping logs or the like into chips which is characterized by:
   a. a supporting surface of a rotatable sheet member,
   b. a plurality of cutting elements mounted radially and angularly spaced on said supporting surface,
   c. a plurality of holes in said sheet member, each hole being located adjacent a cutting element so that any chips formed by said cutting elements may pass through said holes,
   d. a re-inforcing structure comprising
      1. a second member spaced from said first member on the side of said first member remote from said supporting surface, said second member comprising through passages,
      2. channel members structurally connecting said first and second members and forming passages from said holes of said first member to said through passages of said second member, so that any chips formed may pass to the side of said second member remote from said first member via said holes, said channel members and said through passages.

2. An arrangement according to claim 1, said second member being a second sheet member extending parallel to said first sheet member, both of said members being fixedly mounted on the driving shaft of the chipping machine.

3. An arrangement according to claim 1, wherein the number of through passages of said second member is the same as that of said holes of the first member, and said channel members are sleeve like members rigidly connected at one end to said first member and at the other end to said second member and extending each between a hole and a corresponding through passage.

* * * * *